United States Patent
Kubota et al.

(10) Patent No.: US 10,407,785 B2
(45) Date of Patent: Sep. 10, 2019

(54) ADDITIVE FOR HIGH-PURITY COPPER ELECTROLYTIC REFINING AND METHOD OF PRODUCING HIGH-PURITY COPPER

(71) Applicant: MITSUBISHI MATERIALS CORPORATION, Tokyo (JP)

(72) Inventors: Kenji Kubota, Naka (JP); Yoshie Tarutani, Naka (JP); Kiyotaka Nakaya, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 3 days.

(21) Appl. No.: 15/509,496

(22) PCT Filed: Oct. 2, 2015

(86) PCT No.: PCT/JP2015/078050
§ 371 (c)(1),
(2) Date: Mar. 8, 2017

(87) PCT Pub. No.: WO2016/052727
PCT Pub. Date: Apr. 7, 2016

(65) Prior Publication Data
US 2017/0283967 A1    Oct. 5, 2017

(30) Foreign Application Priority Data
Oct. 4, 2014 (JP) ................. 2014-205311
Aug. 29, 2015 (JP) ................. 2015-169880

(51) Int. Cl.
*C25C 1/12* (2006.01)
*C08G 65/329* (2006.01)
*C08L 71/02* (2006.01)

(52) U.S. Cl.
CPC ............. *C25C 1/12* (2013.01); *C08G 65/329* (2013.01); *C08L 71/02* (2013.01); *C08G 2650/04* (2013.01); *C08G 2650/38* (2013.01)

(58) Field of Classification Search
CPC .... C25C 1/12; C08G 65/329; C08G 2650/04; C08G 2650/38; C08L 71/02
See application file for complete search history.

(56) References Cited

U.S. PATENT DOCUMENTS

2008/0264799 A1* 10/2008 Seelmann-Eggebert ................... C25B 1/00 205/351
2009/0306231 A1* 12/2009 Akella ................. B01F 3/0815 516/53

FOREIGN PATENT DOCUMENTS

| CN | 101120119 A | 2/2008 |
|---|---|---|
| CN | 103397349 A | 11/2013 |
| CN | 103510105 A | 1/2014 |
| JP | 08-000990 A | 1/1996 |
| JP | 2001-123289 A | 5/2001 |
| JP | 2005-307343 A | 11/2005 |
| JP | 2008-530367 A | 8/2008 |

OTHER PUBLICATIONS

Office Action dated Jan. 17, 2018, issued for the Chinese patent application No. 201580048272.1 and English translation thereof.
International Search Report dated Oct. 27, 2015, issued for PCT/JP2015/078050.

* cited by examiner

*Primary Examiner* — Ciel P Thomas
(74) *Attorney, Agent, or Firm* — Locke Lord LLP; James E. Armstrong, IV; Nicholas J. DiCeglie, Jr.

(57) ABSTRACT

The additive for high-purity copper electrolytic refining of the present invention is an additive which is added to a copper electrolyte in electrolytic refining for high-purity copper and is formed of a non-ionic surfactant that includes a hydrophobic group containing an aromatic ring and a hydrophilic group containing a polyoxyalkylene group.

16 Claims, No Drawings

ADDITIVE FOR HIGH-PURITY COPPER ELECTROLYTIC REFINING AND METHOD OF PRODUCING HIGH-PURITY COPPER

CROSS REFERENCE TO RELATED APPLICATIONS

This application is related to co-pending application: "ADDITIVE FOR HIGH-PURITY COPPER ELECTROLYTIC REFINING AND METHOD OF PRODUCING HIGH-PURITY COPPER" filed even date herewith in the names of Yoshie TARUTANI, Kenji KUBOTA and Kiyotaka NAKAYA as a national phase entry of PCT/JP2015/078047, which application is assigned to the assignee of the present application and is incorporated by reference herein.

TECHNICAL FIELD

The present invention relates to an additive for high-purity copper electrolytic refining which is used for producing high-purity copper in which the concentration of impurities such as sulfur and silver is greatly reduced, and a method of producing high-purity copper using the additive.

Priorities are claimed on Japanese Patent Application No. 2014-205311, filed on Oct. 4, 2014, and Japanese Patent Application No. 2015-169880, filed on Aug. 29, 2015, the contents of which are incorporated herein by reference.

BACKGROUND ART

As described in PTL 1, a method of performing electrolysis in two stages of performing electrolysis on a copper sulfate aqueous solution; and performing electrolysis again on a copper nitrate aqueous solution at a low current density of 100 A/m$^2$ or less by means of using copper deposited on a cathode as an anode, is known as a method of producing high-purity copper.

Further, as described in PTL 2, a method of producing electrolytic copper foil in which mechanical characteristics and adhesion to a cathode are improved by combining a polyoxyethylene-based surfactant such as polyethylene glycol (PEG) with a copper sulfate electrolyte that contains chlorine ions, glue, and an active sulfur component, is known. Further, as described in PTL 3, a method of producing high-purity electrolytic copper in which the surface of copper is smooth and the amount of impurities such as silver and sulfur is small by combining a smoothing agent such as polyvinyl alcohol (PVA) with a slime accelerator such as PEG, is known.

CITATION LIST

Patent Literature

[PTL 1] Japanese Examined Patent Application, Second Publication No. H08-990
[PTL 2] Japanese Unexamined Patent Application, First Publication No. 2001-123289
[PTL 3] Japanese Unexamined Patent Application, First Publication No. 2005-307343

SUMMARY OF INVENTION

Technical Problem

In the production method including two stages of performing electrolysis in a copper sulfate bath and electrolysis in a copper nitrate bath as that of PTL 1, there is a problem in that considerable time and efforts are taken in the electrolysis. Further, there is another problem in that the use of nitric acid causes a high environmental burden and a complicated waste water treatment.

When a conventional additive (PVA, PEG, or the like) is used, it is difficult to increase the current density. Further, when electrolyte is stirred to increase the current density, slime is blown up and adheres to a cathode so that the purity of electrolytic copper is degraded. In addition, since the additive strongly suppresses dissolution of an anode, the overvoltage required for dissolution of the anode is increased and a large amount of slime is generated at the time of dissolution of the anode. Therefore, the yield of the cathode is decreased and the amount of slime adhering to the cathode is increased. Moreover, since the conventional additive suppresses the deposition reaction of the cathode, there is a problem in that the sulfur concentration of electrodeposited copper is increased and the purity thereof is degraded when an electrolyte contains sulfate groups.

In addition, a water-soluble polymer additive, such as PEG or PVA, has extremely high hydrophilicity and poor ultraviolet absorptivity, quantitative analysis using high performance liquid chromatography (HPLC) is difficult to perform, and the dissolution rate is high. Therefore, it is difficult to accurately control the concentration. Further, dendrites may be easily generated on the surface of electrolytic copper when PEG is used. When PVA is used in order to solve the problem of dendrites, the surface of electrolytic copper becomes smooth, but silver as an impurity is not sufficiently reduced. Moreover, the production method using a surfactant such as PEG described in PTL 2 has a problem in that the amount of sulfur or the like in the electrolytic copper is high and high-purity electrolytic copper is unlikely to be obtained.

The present invention is made to solve the above-described problems of the conventional production methods in production of high-purity copper, and an object thereof is to provide an additive formed of a surfactant including a specific hydrophobic group and a specific hydrophilic group, which causes high-purity copper to be produced in which the concentration of impurities such as sulfur is greatly decreased by suppressing generation of slime using the surfactant as the additive; and a method of producing high-purity copper using the additive.

Solution to Problem

The present invention relates to an additive for high-purity copper electrolytic refining and a method of producing high-purity copper with the following configurations.

[1] An additive for high-purity copper electrolytic refining which is added to a copper electrolyte in electrolytic refining for high-purity copper and is formed of a non-ionic surfactant that includes a hydrophobic group containing an aromatic ring and a hydrophilic group containing a polyoxyalkylene group.

[2] The additive for high-purity copper electrolytic refining according to [1], in which the hydrophilic group contains one of the group consisting of a polyoxyethylene group, a polyoxypropylene group, and a combination of the polyoxyethylene group and the polyoxypropylene group, and the hydrophobic group contains one of the group consisting of a phenyl group and a naphthyl group.

[3] The additive for high-purity copper electrolytic refining according to [1] or [2], in which an added number of moles of the polyoxyalkylene group of the hydrophilic group is 2 to 20.

[4] The additive for high-purity copper electrolytic refining according to [3], which is formed of one of the group consisting of a polyoxyethylene monophenyl ether having an added number of moles of 2 to 15 and polyoxyethylene naphthyl ether having an added number of moles of 2 to 15.

[5] A method of producing high-purity copper including: performing copper electrolysis using a copper electrolyte to which an additive is added which is formed of a non-ionic surfactant that includes a hydrophobic group containing an aromatic ring and a hydrophilic group containing a polyoxyalkylene group.

[6] The method of producing high-purity copper according to [5], in which the copper electrolysis is performed while a concentration of the additive is maintained within a range of 2 to 500 mg/L. [7] The method of producing high-purity copper according to [5] or [6], in which the copper electrolyte is one of the group consisting of a copper sulfate solution, a copper nitrate solution, and a copper chloride solution.

[8] The method of producing high-purity copper according to any one of [5] to [7], in which the copper electrolyte is a copper sulfate solution having a sulfuric acid concentration of 10 to 300 g/L and a copper concentration of 5 to 90 g/L.

[9] The method of producing high-purity copper according to any one of [5] to [7], in which the copper electrolyte is a copper nitrate solution having a nitric acid concentration of 0.1 to 100 g/L and a copper concentration of 5 to 90 g/L.

[10] The method of producing high-purity copper according to any one of [5] to [9], in which high-purity copper is produced in which both of the sulfur concentration and the silver concentration are 1 ppm or less.

Advantageous Effects of Invention

In high-purity copper electrolytic refining, by using the additive of the present invention, the silver concentration and the sulfur concentration of the electrolytic copper are greatly decreased. Since the surface of the electrolytic copper becomes smooth, anode slime or an electrolyte is unlikely to remain on the surface of the electrolytic copper and thus high-purity electrolytic copper with fewer impurities can be obtained. For example, in copper electrolysis using a copper sulfate solution as an electrolyte, electrolytic copper in which the sulfur concentration is significantly small can be obtained. For example, in a preferred aspect of the present invention, high-purity copper in which both of the sulfur concentration and the silver concentration are respectively 1 ppm by mass or less can be obtained. More preferably, high-purity electrolytic copper in which both of the sulfur concentration and the silver concentration are respectively 0.5 ppm by mass or less can be produced.

Since the additive of the present invention does not excessively adhere to the surface of a copper anode, the copper anode is moderately dissolved and the amount of anode slime is smaller than in the case where PEG or the like is used, and thus the yield of electrolytic copper can be improved. Specifically, in a preferred aspect of the present invention, the yield of electrolytic copper can be 90% or higher. Further, since the amount of anode slime is smaller than in the case where PEG or the like is used, electrolysis can be carried out at a high speed while the electrolyte is stirred. Moreover, since polyoxyethylene monophenyl ether as the Formula [1] which will be described later, polyoxyethylene naphthyl ether as the Formula [2] which will be described later, or the like does not contain sulfur in a molecular skeleton, electrolytic copper in which the sulfur content is extremely small can be obtained by using the additive of the present invention, which is formed of any one of these compounds. Further, an additive in which the added number of moles of a polyoxyethylene group or the like is 2 to 20 has excellent stability due to a short molecular chain compared to glue and the bath conditions are easily controlled.

DESCRIPTION OF EMBODIMENTS

Specific Description

Hereinafter, an embodiment of the present invention (hereinafter, referred to as the present embodiment) will be described in detail.

An additive of the present embodiment is an additive for high-purity copper electrolytic refining which is added to a copper electrolyte in electrolytic refining for high-purity copper and is formed of a non-ionic surfactant that includes a hydrophobic group containing an aromatic ring and a hydrophilic group containing a polyoxyalkylene group. Further, a production method of the present embodiment is the method of producing high-purity copper using the above-mentioned additive.

The additive of the present embodiment is a non-ionic surfactant that includes a hydrophobic group containing an aromatic ring and a hydrophilic group containing a polyoxyalkylene group. In the additive of the present embodiment, an aromatic ring of the hydrophobic group is, for example, a phenyl group, a naphthyl group, or the like, and examples thereof include monophenyl, naphthyl, cumyl, alkylphenyl, styrenated phenyl monophenyl, naphthyl, cumyl, alkylphenyl, styrenated phenyl, distyrenated phenyl, tristyrenated phenyl, and tribenzyl phenyl. Further, in the additive of the present embodiment, a polyoxyalkylene group of the hydrophilic group is, for example, a polyoxyethylene group, a polyoxypropylene group, or the like and may include both of a polyoxyethylene group and a polyoxypropylene group.

Specific examples of the compound of the additive of the present embodiment include polyoxyethylene monophenyl ether, polyoxyethylene methyl phenyl ether, polyoxyethylene octyl phenyl ether, polyoxyethylene dodecyl phenyl ether, polyoxyethylene naphthyl ether, polyoxyethylene styrenated phenyl ether, polyoxyethylene distyrenated phenyl ether, polyoxyethylene tristyrenated phenyl ether, polyoxyethylene cumyl phenyl ether, polyoxypropylene monophenyl ether, polyoxypropylene methyl phenyl ether, polyoxypropylene octyl phenyl ether, polyoxypropylene dodecyl phenyl ether, polyoxypropylene naphthyl ether, polyoxypropylene styrenated phenyl ether, polyoxypropylene distyrenated phenyl ether, polyoxypropylene tristyrenated phenyl ether, and polyoxypropylene cumyl phenyl ether.

The additive of the present embodiment is added to an electrolyte in copper electrolytic refining and then used. In the copper electrolytic refining, since the additive of the present embodiment includes a hydrophobic group containing an aromatic ring and a hydrophilic group containing a polyoxyalkylene group, deposition, on a cathode, of silver ions and sulfate ions in the electrolyte is suppressed and the silver concentration and the sulfur concentration of electrolytic copper are greatly decreased. Moreover, according to the additive of the present embodiment, the amount of anode slime is smaller than that in the case where PEG or the like is used. Specifically, the additive of the present embodiment include a hydrophobic group and a hydrophilic group containing a polyoxyalkylene group, does not excessively adhere to the surface of a cathode, and thus does not excessively suppress dissolution of a copper anode. Therefore, since the copper anode is moderately dissolved and the amount of anode slime is smaller than that in the case where PEG or the like is used, the amount of anode slime which adheres to the surface of electrolytic copper deposited on a cathode becomes smaller and high-purity electrolytic copper can be obtained.

A conventional surfactant used for a copper electrolyte, for example, PEG does not have the above-described effects because a hydrophobic group thereof does not have an aromatic ring. Since the conventional surfactant such as PEG strongly adheres to the surface of the copper anode, dissolution of the copper anode is excessively obstructed. Accordingly, there is a disadvantage in that a large amount of anode slime is generated and this anode slime is absorbed in the surface of the electrolytic copper on the cathode so that the copper grade is degraded. Specifically, the sulfur content in the electrolytic copper electrolytically refined using an electrolyte to which PEG or the like is added is significantly greater than that in the case where the additive of the present embodiment is used. The additive of the present embodiment is capable of reducing the sulfur concentration in the electrolytic copper compared to the conventional surfactant such as PEG.

In the additive of the present embodiment, it is preferable that the aromatic ring of the hydrophobic group be a monophenyl group or a naphthyl group. Further, in the additive of the present embodiment, as the polyoxyalkylene group of the hydrophilic group, a polyoxyethylene group, a polyoxypropylene group, or a combination of a polyoxyethylene group and a polyoxypropylene group may be exemplified. Among these, a polyoxyethylene group is particularly preferable. Preferred examples of the additive of the present embodiment include polyoxyalkylene monophenyl ether having an added number of moles of 2 to 20 and polyoxyalkylene naphthyl ether having an added number of moles of 2 to 20.

Specific preferred examples of the additive of the present embodiment are shown below. Formula [1] represents polyoxyethylene monophenyl ether and Formula [2] represents polyoxyethylene naphthyl ether. n of Formulae [1] and [2] represents the added number of moles of a polyoxyethylene group.

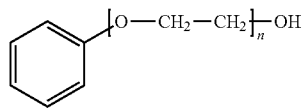
[1]

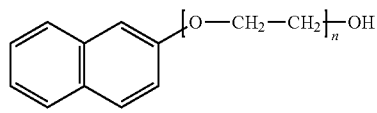
[2]

In the additive of the present embodiment, the added number of moles of the polyoxyalkylene group of the hydrophilic group is preferably 2 to 20 and more preferably 2 to 15. When the added number of moles is less than 2, the additive is not dissolved in an electrolyte. When the added number of moles exceeds 20, since the additive adhering to the surface of the anode becomes excessively fine and the dissolution reaction of the anode is excessively suppressed, a large amount of anode slime is generated and the yield of electrolytic copper is decreased. Further, when the added number of moles exceeds 20, dendrites are easily generated on the surface of electrolytic copper deposited on the cathode and the smoothness thereof is degraded. Therefore, since the anode slime or sulfur in an electrolyte easily adheres to the surface of electrolytic copper and remains thereon, the purity of electrolytic copper is degraded. When the added number of moles of the polyoxyalkylene group is 2 to 20, the dissolution of the anode appropriately progresses and thus the amount of anode slime is smaller than in the case where PEG or the like is used. Therefore, high-purity electrolytic copper can be obtained. Further, the additive including a polyoxyalkylene group having an added number of moles of 2 to 15 can greatly reduce the sulfur content in the electrolytic copper.

Since the bath temperature of an electrolyte affects the electrodeposition reaction, the preferable range of the added number of moles of the polyoxyethylene group varies depending on the bath temperature thereof. For example, the added number of moles is preferably 2 to 15 when the bath temperature thereof is in a range of 20° C. to 55° C. and the added number of moles is preferably 9 to 20 when the bath temperature thereof is in a range of 55° C. to 75° C.

A compound which does not include a phenyl group or a naphthyl group and which only includes a polyoxyethylene group or the like as a hydrophilic group has a poor effect in suppressing electrodeposition on the cathode. For example, when polyoxyethylene glycol having an added number of moles of 8 is used, the surface, particularly the end portion of the electrolytic copper, becomes rough under the condition of, for example, a current density of 200 A/m$^2$, compared to a case where polyoxyethylene monophenyl ether in which the added number of moles of a polyoxyethylene group is 8 is used as the additive.

The additive of the present embodiment is added to the copper electrolyte in electrolytic refining for high-purity copper and then used. The concentration of the additive in the copper electrolyte is preferably in a range of 2 to 500 mg/L and more preferably in a range of 10 to 300 mg/L. When the concentration of the additive is less than 2 mg/L, the smoothness of the surface of the electrolytic copper is degraded due to the poor effect obtained from the addition, sulfur components in the electrolyte adheres to the surface of the electrolytic copper and is easily absorbed therein, and thus the sulfur concentration in the electrolytic copper is increased. On the other hand, when the concentration of the additive is greater than 500 mg/L, the amount of slime to be generated is increased due to strong adhesion of the additive to the surface of the anode, the slime and an excessive amount of additive are absorbed in the electrolytic copper, and thus the sulfur concentration and the silver concentration in the electrolytic copper are increased.

The copper electrolyte to which the additive of the present embodiment is to be added, is a copper compound solution of mineral acid such as a copper sulfate solution, a copper nitrate solution, or a copper chloride solution. In a case where a copper sulfate solution is used as an electrolyte, the sulfuric acid concentration is preferably in a range of 10 to 300 g/L. When the sulfuric acid concentration is less than 10 g/L, copper hydroxide is generated in electrolytic copper and the deposition state is degraded. On the other hand, when the sulfuric acid concentration is greater than 300 g/L, the amount of sulfuric acid to be absorbed in the electrolytic copper is increased and the sulfur concentration is increased.

Further, the sulfuric acid concentration is more preferably in a range of 20 to 100 g/L. In a case where a copper nitrate solution is used as the electrolyte, the nitric acid concentration is preferably in a range of 0.1 to 100 g/L and more preferably in a range of 1 to 50 g/L. In a case where a copper chloride solution is used as the electrolyte, the hydrochloric acid concentration is preferably in a range of 10 to 300 g/L and more preferably in a range of 15 to 75 g/L.

Even when the copper electrolyte is any one of a copper sulfate solution, a copper nitrate solution, and a copper chloride solution, the copper concentration of the electrolyte is preferably in a range of 5 to 90 g/L (the copper sulfate pentahydrate concentration is preferably in a range of 20 to 350 g/L, the copper nitrate trihydrate concentration is preferably in a range of 19 to 342 g/L, and the copper chloride dihydrate concentration is preferably in a range of 13 to 241 g/L). When the copper concentration is less than 5 g/L, since the electrolytic copper is deposited in a powder state, the purity thereof is degraded. On the other hand, when the copper concentration is greater than 90 g/L, the electrolyte is easily absorbed in the electrolytic copper, and thus the purity thereof is degraded. Further, the copper concentration of the copper electrolyte is more preferably in a range of 40 to 80 g/L.

In a case where the electrolyte is a copper sulfate bath (copper sulfate solution) or a copper nitrate bath (copper nitrate solution), the chloride ion concentration of the electrolyte is preferably 200 mg/L or less. When the chloride ion concentration is greater than 200 mg/L, a chloride is easily absorbed in the electrolytic copper, and thus the purity of the electrolytic copper is degraded. Further, it is preferable that the lower limit of the chloride ion concentration is set to 1 mg/L and more preferable that the chloride ion concentration is set to be in a range of 10 to 100 mg/L.

The additive of the present embodiment is a non-ionic surfactant that includes a hydrophilic group such as a polyoxyethylene group and a hydrophobic group such as a phenyl group or a naphthyl group and has strong ultraviolet absorptivity and hydrophobicity. Therefore, quantitative analysis using high performance liquid chromatography (HPLC) can be performed. Here, the electrolysis may be performed in a manner in which the concentration of the additive is measured by HPLC and a decreased amount of the additive is replenished such that the concentration of the additive is maintained to be preferably in a range of 2 to 500 mg/L and more preferably in a range of 10 to 300 mg/L.

EXAMPLES

Examples and comparative examples of the present invention will be described below. The sulfur concentration and the silver concentration in a central portion of electrolytic copper which was subjected to electrolytic refining were measured by glow discharge mass spectrometry (GD-MS). The results are shown in each Table. The smoothness of each surface of electrolytic copper was evaluated based on the generation of dendrites (dendron) and a state of powdery deposition. Samples with very few amounts of dendrites and powdery deposition were evaluated as excellent "A", samples with a slight amount of dendrites and powdery deposition were evaluated as good "B", and samples with a large amount of dendrites or powdery deposition were evaluated as no-good "C". Specifically, samples in which 2 to 5 pieces of dendrites per 10 cm square were seen were evaluated as B. Further, samples in which 6 or more pieces of dendrites per 10 cm square were seen or samples in which powdery deposition was seen were evaluated as C. Other samples which were determined not to have dendrites benign generated or powdery deposition were evaluated as A.

The slime generation rate was acquired by the following equation.

Slime generation rate (%)=100−(weight of deposited electrolytic copper)/(dissolution amount of anode(weight))×100

Example 1

A copper sulfate solution with a sulfuric acid concentration of 100 g/L, a copper sulfate pentahydrate concentration of 200 g/L, and a chloride ion concentration of 100 mg/L was used as an electrolyte. 30 mg/L of an additive A1 or an additive B1 was added to the electrolyte. As an anode, electrolytic copper having a sulfur concentration of 5 ppm by mass and a silver concentration of 8 ppm by mass was used. The current density was set to 200 A/m$^2$ or 500 A/m$^2$ and electrolysis was performed at a bath temperature of 55° C. The concentration of the additive was measured by HPLC using an ODS column every 12 hours and the decreased amount of the additive was replenished such that the concentration of the additive was maintained at 30 mg/L, while producing electrolytic copper through electrolytic refining. As the additive A1, polyoxyethylene monophenyl ether (in which the added number of moles of ethylene oxide was 20) was used. As the additive B1, polyoxyethylene naphthyl ether (in which the added number of moles of ethylene oxide was 20) was used.

The results are shown in Table 1. As shown in Table 1, since the additives A1 and B1 included a hydrophobic group containing an aromatic ring and a hydrophilic group containing a polyoxyalkylene group, the small amount of slime was generated, the sulfur concentration of each electrolytic copper was 4.03 ppm by mass or less, the silver concentration thereof was 1.1 ppm by mass or less, and the smoothness of the surface of each electrolytic copper was almost excellent.

Comparative Example 1

As a comparative example, electrolytic copper (Sample Nos. 5 to 8) was produced through electrolytic refining under the same conditions as in Example 1 except that, as an additive C, polyoxyethylene alkyl ether (in which the added number of moles of ethylene oxide was 8 or 12) was used.

In addition, electrolytic copper (Sample No. 9) was produced through electrolytic refining under the same conditions as in Example 1 except that no additive was used. Moreover, electrolytic copper (Sample No. 10) was produced through electrolytic refining in the same manner as in Example 1 except that polyethylene glycol (PEG) was added as an additive. The results are shown in Table 1.

As shown in Table 1, in Sample No. 9 in which no additive was used, the amount of slime was small, but the sulfur content and the silver content were large and the smoothness of the surface of the electrolytic copper was poor. In Sample No. 10 in which PEG was used, the sulfur content and the silver content were small but the amount of slime was large. In each of Sample Nos. 5 to 8 in which the additive C was used, the silver concentration was 1 ppm by mass or less. However, since the additive C did not include a hydrophobic group containing an aromatic ring, the slime generation rate thereof was similar extent to Sample No. 10 in which PEG was used, the sulfur concentration of the electrolytic copper was 4.2 ppm by mass or more, and the smoothness of the surface of the electrolytic copper was poor due to the large amount of dendrites thereon.

TABLE 1

| No | Electrolyte | Additive Type | n | Concentration | Current density (A/m$^2$) | Slime generation rate (%) | Electrolytic copper S | Ag | Smoothness |
|---|---|---|---|---|---|---|---|---|---|
| 1 | Copper | A1 | 20 | 30 | 200 | 20 | 1.63 | 0.6 | A |
| 2 | sulfate | | | | 500 | 25 | 3.50 | 0.8 | B |
| 3 | Copper | B1 | 20 | 30 | 200 | 18 | 1.82 | 0.9 | B |
| 4 | sulfate | | | | 500 | 23 | 4.03 | 1.1 | B |
| 5 | Copper | C | 8 | 30 | 200 | 32 | 4.2 | 0.4 | C |
| 6 | sulfate | | | | 500 | 35 | 7.6 | 0.5 | C |
| 7 | | | 12 | 30 | 200 | 29 | 8.1 | 0.7 | C |
| 8 | | | | | 500 | 40 | 12.1 | 0.9 | C |
| 9 | Copper sulfate | — | — | — | 500 | 3 | 62 | 3.8 | C |
| 10 | Copper sulfate | PEG | | 30 | 500 | 42 | 4.8 | 2.1 | C |

(Note)
The additive A1 represents polyoxyethylene phenyl ether (the added number of moles is 20), the additive B1 represents polyoxyethylene naphthyl ether (the added number of moles is 20), the additive C represents polyoxyethylene alkyl ether, and PEG represents polyethylene glycol. n of the additive represents the added number of moles of ethylene oxide, and the unit of the concentration of the additive is mg/L. Slime generation rate: [100 − (electrodeposition amount of cathode)/(dissolution amount of anode) × 100] S represents the sulfur concentration, Ag represents the silver concentration, and the units thereof are ppm. Nos. 1 to 4 are examples and Nos. 5 to 10 are comparative examples.

Example 2

Electrolytic refining was performed on electrolytic copper under the same conditions as in Example 1 except that polyoxyethylene monophenyl ether (additive A2) in which the added number of moles of ethylene oxide was 2, 5 or 10 or polyoxyethylene naphthyl ether (additive B2) in which the added number of moles of ethylene oxide was 7 or 13 and a bath temperature set to 30° C. were used. The results are shown in Table 2.

The additives A2 and B2 in Example 2 had the added number of moles of ethylene oxide within a range of 2 to 15 and shorter molecular chain than those of the additives A1 and B1 of Example 1. In each electrolytic copper of Example 2, the sulfur concentration was 0.095 ppm by mass or less and the silver concentration was 0.5 ppm by mass or less, which were significantly less than those of Example 1. Further, the smoothness of the surface thereof was excellent.

in which the added number of moles of ethylene oxide was 5, polyoxyethylene naphthyl ether was used as additive B3 in which the added number of moles of ethylene oxide was 7, the concentrations of the additives A3 and B3 were controlled as shown in Table 3, and the current density was set to 200 A/m$^2$. The results are shown in Table 3.

As shown in Table 3, in each of Sample Nos. 23 to 25 in which the concentration of the additive A3 was 2 to 500 mg/L, the sulfur concentration and the silver concentration in the electrolytic copper were low, and a high-purity electrolytic copper with an excellent smoothness of the surface thereof was obtained. On the other hand, in each of Sample Nos. 21, 26 in which the concentration of the additive was 1 mg/L and 600 mg/L, respectively, the sulfur concentration of the electrolytic copper was slightly high.

TABLE 2

| No | Electrolyte | Additive Type | n | Concentration | Current density (A/m$^2$) | Slime generation rate (%) | Electrolytic copper S | Ag | Smoothness |
|---|---|---|---|---|---|---|---|---|---|
| 11 | Copper | A2 | 2 | 30 | 200 | 8 | 0.069 | 0.2 | A |
| 12 | sulfate | | | | 500 | 11 | 0.085 | 0.3 | A |
| 13 | | | 5 | 30 | 200 | 12 | 0.012 | 0.16 | A |
| 14 | | | | | 500 | 13 | 0.025 | 0.5 | A |
| 15 | | | 10 | 30 | 200 | 11 | 0.065 | 0.15 | A |
| 16 | | | | | 500 | 15 | 0.077 | 0.2 | A |
| 17 | Copper | B2 | 7 | 30 | 200 | 9 | 0.018 | 0.4 | A |
| 18 | sulfate | | | | 500 | 13 | 0.059 | 0.5 | A |
| 19 | | | 13 | 30 | 200 | 12 | 0.095 | 0.25 | A |
| 20 | | | | | 500 | 15 | 0.013 | 0.3 | A |

(Note)
The additive A2 represents polyoxyethylene phenyl ether (the added number of moles is 2, 5 or 10), and the additive B2 represents polyoxyethylene naphthyl ether (the added number of moles is 7 or 13). n of the additive represents the added number of moles of ethylene oxide, and the unit of the concentration of the additive is mg/L. Slime generation rate: [100 − (electrodeposition amount of cathode)/(dissolution amount of anode) × 100] S represents the sulfur concentration, Ag represents the silver concentration, and the units thereof are ppm. No. 11 to No. 20 are examples.

Example 3

Electrolytic refining was performed on electrolytic copper under the same conditions as in Example 2 except that polyoxyethylene monophenyl ether was used as additive A3

Accordingly, it is preferable that the concentration of the additive is within a range of 2 to 500 mg/L. Regarding the additive B3, it was confirmed that there is similar tendency to that of the additive A3.

TABLE 3

| No | Electrolyte | Additive Type | Concentration (mg/L) | Current density (A/m$^2$) | Slime generation rate (%) | Electrolytic copper S | Ag | Smoothness |
|---|---|---|---|---|---|---|---|---|
| 21 | Copper | A3 | 1 | 200 | 6 | 0.501 | 0.5 | B |
| 22 | sulfate | | 2 | 200 | 7 | 0.095 | 0.2 | A |
| 23 | | | 30 | 200 | 11 | 0.010 | 0.2 | A |
| 24 | | | 300 | 200 | 16 | 0.121 | 0.3 | A |
| 25 | | | 500 | 200 | 19 | 0.143 | 0.6 | A |
| 26 | | | 600 | 200 | 32 | 0.725 | 0.8 | B |
| 27 | Copper | B3 | 1 | 200 | 5 | 0.61 | 0.4 | B |
| 28 | sulfate | | 2 | 200 | 8 | 0.4 | 0.6 | A |
| 29 | | | 500 | 200 | 18 | 0.45 | 0.5 | A |
| 30 | | | 600 | 200 | 33 | 1.24 | 1.5 | B |

(Note)
The additive A3 represents polyoxyethylene monophenyl ether having the added number of moles of ethylene oxide of 5, and the additive B3 represents polyoxyethylene naphthyl ether having the added number of moles of ethylene oxide of 7. Slime generation rate: [100 − (electrodeposition amount of cathode)/(dissolution amount of anode) × 100] S represents the sulfur concentration, Ag represents the silver concentration, and the units thereof are ppm. No. 21 to No. 30 are examples, No. 22 to No. 25 and No. 28 to No. 29 are within the preferable ranges.

Example 4

A copper nitrate solution with the nitric acid concentration of 5 g/L, the copper nitrate trihydrate concentration of 150 g/L, and the chloride ion concentration of 100 mg/L, was used as an electrolyte. 30 mg/L of an additive A4 or an additive B4 was added to the electrolyte. The additive A3 was polyoxyethylene monophenyl ether in which the added number of moles of ethylene oxide was 2, 10 or 20, and the additive B3 was polyoxyethylene naphthyl ether in which the added number of moles of ethylene oxide was 2, 10 or 20. Electrolytic refining was performed on electrolytic copper in the same manner as in Example 2 while the current density was set to 200 A/m$^2$.

The results are shown in Table 4. As shown in Table 4, when the additive A4 or B4 in the present invention was added to the electrolyte, the amount of slime being generated was small and thus the yield was superior, the sulfur concentration of the electrolytic copper was 0.1 ppm by mass or less, the silver concentration thereof was 1 ppm by mass or less, and the smoothness of the surface of the electrolytic copper was excellent, even in a case where the copper nitrate solution was used as an electrolyte.

Example 5

Electrolytic refining was performed on electrolytic copper in the same manner as in Example 4 except that an additive A5 (polyoxyethylene monophenyl ether in which the added number of moles of ethylene oxide was 5) or an additive B5 (polyoxyethylene naphthyl ether in which the added number of moles of ethylene oxide was 7) was added in an amount to be in the concentration shown in Table 5. The results are shown in Table 5. As shown in Table 5, in both cases of using the additives A5 and B5, the samples (Nos. 38, 39, 42 and 43) in each of which the concentration of the additive in the copper nitrate solution as the electrolyte was 2 to 500 mg/L had a small amount of impurities and an excellent smoothness of the surface of the electrolytic copper, compared to the samples (Nos. 37, 40, 41 and 44) in each of which the concentration of the additive was 1 mg/L or 600 mg/L. Accordingly, it is preferable that the concentration of the additive is 2 to 500 mg/L even in the copper nitrate solution as the electrolyte.

TABLE 4

| No | Electrolyte | Additive Type | n | Concentration | Current density (A/m$^2$) | Slime generation rate (%) | Electrolytic copper S | Ag | Smoothness |
|---|---|---|---|---|---|---|---|---|---|
| 31 | Copper | A4 | 2 | 30 | 200 | 9 | 0.09 | 0.5 | A |
| 32 | nitrate | | 10 | 30 | 200 | 11 | 0.05 | 0.4 | A |
| 33 | | | 20 | 30 | 200 | 18 | 0.08 | 0.6 | A |
| 34 | Copper | B4 | 2 | 30 | 200 | 7 | 0.08 | 0.2 | A |
| 35 | nitrate | | 10 | 30 | 200 | 10 | 0.06 | 0.3 | A |
| 36 | | | 20 | 30 | 200 | 17 | 0.09 | 0.5 | A |

(Note)
The additive A4 represents polyoxyethylene phenyl ether (the added number of moles is 2, 10 or 20), and the additive B4 represents polyoxyethylene naphthyl ether (the added number of moles is 2, 10 or 20). n of the additive represents the added number of moles of ethylene oxide, and the unit of the concentration of the additive is mg/L. Slime generation rate: [100 − (electrodeposition amount of cathode)/(dissolution amount of anode) × 100] S represents the sulfur concentration, Ag represents the silver concentration, and the units thereof are ppm. No. 31 to No. 36 are examples.

TABLE 5

| No | Electrolyte | Additive Type | Concentration (mg/L) | Current density (A/m²) | Slime generation rate (%) | Electrolytic copper S | Ag | Smoothness |
|---|---|---|---|---|---|---|---|---|
| 37 | Copper | A5 | 1 | 200 | 6 | 0.09 | 0.3 | B |
| 38 | nitrate | | 2 | 200 | 8 | 0.08 | 0.2 | A |
| 39 | | | 500 | 200 | 15 | 0.07 | 0.4 | A |
| 40 | | | 600 | 200 | 35 | 0.15 | 1.1 | B |
| 41 | Copper | B5 | 1 | 200 | 9 | 0.08 | 0.4 | B |
| 42 | nitrate | | 2 | 200 | 12 | 0.07 | 0.3 | A |
| 43 | | | 500 | 200 | 19 | 0.08 | 0.5 | A |
| 44 | | | 600 | 200 | 32 | 0.21 | 1.2 | B |

(Note)
The additive A5 represents polyoxyethylene monophenyl ether having the added number of moles of ethylene oxide of 5, and the additive B5 represents polyoxyethylene naphthyl ether having the added number of moles of ethylene oxide of 7. Slime generation rate: [100 − (electrodeposition amount of cathode)/(dissolution amount of anode) × 100] S represents the sulfur concentration, Ag represents the silver concentration, and the units thereof are ppm. No. 37 to No. 44 are examples, No. 38 to No. 39 and No. 42 to No. 43 are within the preferable ranges.

Example 6

Electrolytic refining was performed on electrolytic copper in the same manner as in Example 1 except that a copper sulfate solution was used as an electrolyte, the sulfuric acid concentration and the copper concentration were adjusted as shown in Table 6, and an additive A6 (polyoxyethylene monophenyl ether in which the added number of moles of ethylene oxide was 5) was added to the electrolyte so as to have the concentration of 30 mg/L. The results are shown in Table 6 (Nos. 45 to 48).

In addition, Electrolytic refining was performed on electrolytic copper in the same manner as in Example 4 except that a copper nitrate solution was used as an electrolyte, the nitric acid concentration and the copper concentration were adjusted as shown in Table 6, and an additive B6 (polyoxyethylene naphthyl ether in which the added number of moles of ethylene oxide was 7) was added to the electrolyte so as to have the concentration of 30 mg/L. The results are shown in Table 6 (Nos. 49 to 52). As shown in Table 6, each of the samples (Nos. 46 and 47) in which the sulfuric acid concentration was 10 to 300 g/L and the copper concentration was 5 to 90 g/L had a small amount of impurities in the electrolytic copper and an excellent smoothness of the surface of the electrolytic copper. However, each of the samples (Nos. 45 and 48) in which the sulfuric acid concentration and the copper concentration were out of the above-described ranges had a coarse surface of the electrodeposited copper and/or the amount of slime being generated was large. Accordingly, it is preferable that the sulfate solution used as an electrolyte has the sulfuric acid concentration of 10 to 300 g/L and the copper concentration of 5 to 90 g/L.

As shown in Table 6, each of the samples (Nos. 50 and 51) in which the nitric acid concentration was 0.1 to 100 g/L and the copper concentration was 5 to 90 g/L had a small amount of impurities in the electrolytic copper and an excellent smoothness of the surface of the electrolytic copper. However, each of the samples (Nos. 49 and 52) in which the nitric acid concentration and the copper concentration were out of the above-described ranges had a coarse surface of the electrodeposited copper and/or the amount of slime being generated was large. Accordingly, it is preferable that the copper nitrate solution used as an electrolyte has the nitric acid concentration of 0.1 to 100 g/L and the copper concentration of 5 to 90 g/L.

TABLE 6

| No | Electrolyte Type | Acid concentration | Copper concentration | Type and concentration of additive | Slime generation rate (%) | Electrolytic copper S | Ag | Smoothness |
|---|---|---|---|---|---|---|---|---|
| 45 | Copper | 400 | 2 | A6 | 9 | 3.5 | 0.3 | C |
| 46 | sulfate | 300 | 5 | 30 mg/L | 10 | 0.5 | 0.2 | B |
| 47 | | 10 | 90 | | 18 | 0.7 | 0.1 | A |
| 48 | | 1 | 100 | | 32 | 1.5 | 1.1 | C |
| 49 | Copper | 120 | 2 | B6 | 10 | 0.4 | 1.5 | C |
| 50 | nitrate | 100 | 5 | 30 mg/L | 13 | 0.1 | 0.4 | B |
| 51 | | 50 | 90 | | 15 | 0.2 | 0.5 | A |
| 52 | | 0.1 | 100 | | 36 | 0.5 | 1.8 | C |

(Note)
The additive A6 represents polyoxyethylene monophenyl ether having the added number of moles of ethylene oxide of 5, and the additive B6 represents polyoxyethylene naphthyl ether having the added number of moles of ethylene oxide of 7. Slime generation rate: [100 − (electrodeposition amount of cathode)/(dissolution amount of anode) × 100] S represents the sulfur concentration, Ag represents the silver concentration, and the units thereof are ppm. No. 46 to No. 47 and No. 50 to No. 51 are within the preferable ranges.

INDUSTRIAL APPLICABILITY

According to the additive for high-purity copper electrolytic refining and the method of producing high-purity copper using the additive of the present invention, it is possible to produce high-purity copper in which the sulfur concentration and the silver concentration is greatly reduced while the generation of slime is suppressed.

The invention claimed is:

1. An additive for high-purity copper electrolytic refining which is added to a copper electrolyte in electrolytic refining for high-purity copper and is formed of a non-ionic surfactant that includes a hydrophobic group containing an aromatic ring and a hydrophilic group containing a polyoxyalkylene group, wherein
the additive is a polyoxyethylene monophenyl ether of formula [1] or a polyoxyethylene naphthyl ether of formula [2]

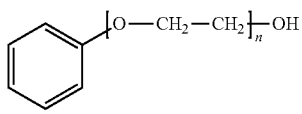

[1]

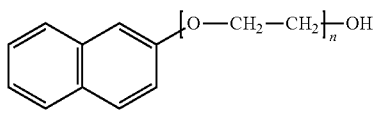

[2]

wherein n represents an added number of moles of the polyoxyalkylene group of 2 to 15.

2. A method of producing high-purity copper comprising:
performing copper electrolysis using a copper electrolyte to which an additive is added which is formed of a non-ionic surfactant that includes a hydrophobic group containing an aromatic ring and a hydrophilic group containing a polyoxyalkylene group, wherein
the additive is a polyoxyethylene monophenyl ether of formula [1] or a polyoxyethylene naphthyl ether of formula [2]

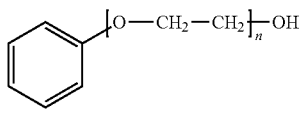

[1]

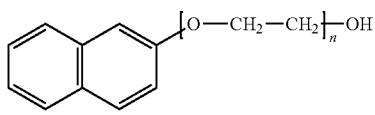

[2]

wherein n represents an added number of moles of the polyoxyalkylene group of 2 to 15.

3. The method of producing high-purity copper according to claim 2, wherein
the copper electrolysis is performed while a concentration of the additive is maintained within a range of 2 to 500 mg/L.

4. The method of producing high-purity copper according to claim 2, wherein
the copper electrolyte is one of the group consisting of a copper sulfate solution, a copper nitrate solution, and a copper chloride solution.

5. The method of producing high-purity copper according to claim 2, wherein the copper electrolyte is a copper sulfate solution having a sulfuric acid concentration of 10 to 300 g/L and a copper concentration of 5 to 90 g/L.

6. The method of producing high-purity copper according to claim 2, wherein
the copper electrolyte is a copper nitrate solution having a nitric acid concentration of 0.1 to 100 g/L and a copper concentration of 5 to 90 g/L.

7. The method of producing high-purity copper according to claim 2, wherein
high-purity copper is produced in which both of the sulfur concentration and the silver concentration are 1 ppm or less.

8. The method of producing high-purity copper according to claim 3, wherein
the copper electrolyte is one of the group consisting of a copper sulfate solution, a copper nitrate solution, and a copper chloride solution.

9. The method of producing high-purity copper according to claim 3, wherein
the copper electrolyte is a copper sulfate solution having a sulfuric acid concentration of 10 to 300 g/L and a copper concentration of 5 to 90 g/L.

10. The method of producing high-purity copper according to claim 4, wherein
the copper electrolyte is a copper sulfate solution having a sulfuric acid concentration of 10 to 300 g/L and a copper concentration of 5 to 90 g/L.

11. The method of producing high-purity copper according to claim 3, wherein
the copper electrolyte is a copper nitrate solution having a nitric acid concentration of 0.1 to 100 g/L and a copper concentration of 5 to 90 g/L.

12. The method of producing high-purity copper according to claim 4, wherein
the copper electrolyte is a copper nitrate solution having a nitric acid concentration of 0.1 to 100 g/L and a copper concentration of 5 to 90 g/L.

13. The method of producing high-purity copper according to claim 3, wherein
high-purity copper is produced in which both of the sulfur concentration and the silver concentration are 1 ppm or less.

14. The method of producing high-purity copper according to claim 4, wherein
high-purity copper is produced in which both of the sulfur concentration and the silver concentration are 1 ppm or less.

15. The method of producing high-purity copper according to claim 5, wherein
high-purity copper is produced in which both of the sulfur concentration and the silver concentration are 1 ppm or less.

16. The method of producing high-purity copper according to claim 6, wherein
high-purity copper is produced in which both of the sulfur concentration and the silver concentration are 1 ppm or less.

* * * * *